(12) United States Patent
Fretel et al.

(10) Patent No.: US 7,277,170 B2
(45) Date of Patent: Oct. 2, 2007

(54) DEVICE AND METHOD FOR SPECTROSCOPIC MEASUREMENT WITH AN IMAGING DEVICE COMPRISING A MATRIX OF PHOTODETECTORS

(75) Inventors: Emmanuel Fretel, Epinay sur Orge (FR); Yves Danthez, La Norville (FR); Catherine Wallerand, Massy (FR); Arshad Mirza, Lewittown, PA (US)

(73) Assignee: Jobin Yvon SAS, Longjumeau (FR)

( * ) Notice: Subject to any disclaimer, the term of this patent is extended or adjusted under 35 U.S.C. 154(b) by 264 days.

(21) Appl. No.: 10/933,165

(22) Filed: Sep. 2, 2004

(65) Prior Publication Data
US 2005/0024639 A1 Feb. 3, 2005

(30) Foreign Application Priority Data
Sep. 3, 2003 (FR) .................................. 03 50497

(51) Int. Cl.
*G01J 3/28* (2006.01)
(52) U.S. Cl. ..................................................... 356/326
(58) Field of Classification Search ......... 356/300–334
See application file for complete search history.

(56) References Cited

U.S. PATENT DOCUMENTS 4,330,209 A    5/1982   Hashimoto et al.
5,116,123 A *  5/1992   Kuderer ...................... 356/326
6,038,023 A *  3/2000   Carlson et al. .............. 356/326
6,373,568 B1 * 4/2002   Miller et al. ................. 356/326
2002/0018203 A1 * 2/2002 Battle et al. ................. 356/319

FOREIGN PATENT DOCUMENTS

EP      0615115      3/1994
FR      2810186      6/2000

OTHER PUBLICATIONS

French Application 03 50497 International Search Report.

* cited by examiner

*Primary Examiner*—Tarifur Chowdhury
*Assistant Examiner*—Isiaka O Akanbi
(74) *Attorney, Agent, or Firm*—Anthony H. Handal; Brown Rudnick Berlack Israels LLP

(57) ABSTRACT

A device and a method for spectroscopic measurement of the spectrum of a light beam. The method includes detecting the dispersed light fluxes of the beam on an imaging device comprising a matrix of photodetectors with active columns, directing the imaging device so that one wavelength is allocated to a line of photodetectors, determining for each light flux the exposure time $\tau_i$ necessary to measure a maximal intensity $I_{max}$ and the sub-matrix $M_i$ of photodetectors associated with the light fluxes, allocating to the sub-matrix $M_i$ of photodetectors an exposure time $\tau'_i$ so that $\tau'_i$ is the largest integer divider of the total integration time T smaller than $\tau_i$, measuring and resetting, during the integration time T of said spectrum, at each time $\tau'_i$, the corresponding sub-matrix $M_i$ independently of the other sub-matrices $M_j$ with $j \neq i$, and measuring the spectrum of the beam at the time T.

13 Claims, 3 Drawing Sheets

DEVICE AND METHOD FOR SPECTROSCOPIC MEASUREMENT WITH AN IMAGING DEVICE COMPRISING A MATRIX OF PHOTODETECTORS

The present invention relates to a device and a method for spectroscopic measurement with an imaging device comprising a matrix of photodetectors with active columns of CMOS ("Complementary Metal Oxide Semiconductor") type.

The emergence of imaging devices implementing a matrix of photodetectors of the CCD (Charge couple device) has paved the way, by enabling simultaneous acquisition of the whole spectrum, to the advantages of the spectroscopy multiplexed analysis, either Raman, ICP (Inductively coupled plasma), NIRS (Near infrared reflectance spectroscopy) or other.

In ICP-type emission spectroscopy, for instance, the light beam emitted by atom and ions from the plasma, is sent to a spectrometer (a diffraction grid spectrometer, a prism spectrometer . . . ) for analysis. The dispersing element (diffraction grid, prism . . . ) then spreads the light beam spectrally and sends the radiations centred on different and dispersed wavelengths to a detector comprising a line/column matrix of photodetectors. This spreading is, for instance, performed in a direction perpendicular to the columns of the detector. The light beam received has a spectral distribution 1 (FIG. 1) giving the intensity (axis 2) relative to the wavelength (axis 3). This spectral distribution 1 exhibits for instance little peaks 4, quasi-flat portions 5 and high peaks 6. One may also distinguish zones 7, 8 or 9 corresponding respectively to the different levels of intensity (4, 5 and 6) of the spectral curve 1. Each of these zones covers one or several pixels of the photodetector.

When a photodetector receives a photon, it converts the latter into an electric charge with a probability equal to the quantum efficiency of the detector. The dynamics of a photodetector express the relation between the maximal number of charges (full well capacity) which may be contained in a photodetector on the standard deviation of the number of charges generated randomly in the absence of light (thermal noise and reading noise). Only between both these extremes, the response of the photodetector is linear, which forms the working range of the photodetector. This dynamics are of the order of a few 100,000 for the best current photodetectors. Still the dynamics in ICP-type emission spectroscopy are quite widespread, of the order of $10^8$. It appears therefore that these detectors cannot cope with such dynamics.

There results that the sensitivity adaptation of the detector for measuring high peaks 6, for instance, prevents the detection of smaller peaks 4. The latter are simply "drowned" in the thermal and reading noises. The operator must then increase the exposure time to the light of the detector in order to show these smaller intensity peaks, for instance situated in the zone 8 of the spectral curve 1 of the FIG. 1, which will undesirably saturate the zones of intense light 6.

The current detectors (CCD . . . ) do not enable therefore simultaneous measurement of signals whereof the luminosity is quite varied.

The purpose of the present invention is to suggest a method for spectroscopic measurement with an imaging device, simple in its design and in its operating mode, enabling simultaneous analysis of signals with very different luminosities.

It is another object of the present invention to break free from any standardisation relative to the gains of column amplifiers for the CMOS cameras with active columns when such a CMOS camera is used for the acquisition of a spectrum.

To this end, the invention relates to a device for spectroscopic measurement of the spectrum of a light beam comprising a set of light fluxes each centred over a different wavelength wherein the set of said fluxes is dispersed on a dispersive element and the flux dispersed are detected on an imaging device comprising a matrix of photodetectors with active columns, each of the photodetectors comprising a CMOS-type pixel.

According to the invention, the imaging device with active columns is directed so that one wavelength is allocated to a line of photodetectors to enable simultaneous analysis of light fluxes each centred over a different wavelength and having different light intensities.

In different embodiments, the present invention also relates to the following features which will be considered individually or according to all their technically possible combinations:

the measuring device comprises:
  means to set for each sub-matrix Mi of photodetectors with i=(1, 2, . . . n), an exposure time $\tau'_i$ so that $\tau'_i$ is the largest integer divider of T smaller than $\tau_i$, with T total integration time chosen by the user,
  means for storing the signal measured for each sub-matrix $M_i$ of photodetectors with i=(1, 2, . . . , n),
  a processing unit to determine the total signal obtained at the time T for each of the sub-matrices $M_i$,
  means for visualising the spectrum of the beam,
the measuring device comprises a reference light source having a reference spectrum.

The invention relates to also a method for spectroscopic measurement of the spectrum of a light beam comprising a set of light fluxes each centred over a different wavelength, whereon the set of said fluxes is dispersed over a dispersive element and the fluxes dispersed are detected on an imaging device comprising a matrix of photodetectors with active columns, each of the photodetectors comprising a CMOS-type pixel.

According to the invention,
  the imaging device with active columns is directed so that one wavelength is allocated to a line of photodetectors,
  one determines for each light flux i=(1, 2, . . . , n) the exposure time $\tau_i$ necessary to measure a maximal intensity $I_{max}$ and the sub-matrix $M_i$ of photodetectors associated with said light fluxes, each of said fluxes i=(1, 2, . . . , n) being detected on at least one different line of photodetectors,
  one allocates to the sub-matrix $M_i$ of photodetectors an exposure time $\tau'_i$ so that $\tau'_i$ is the largest integer divider of T smaller than $\tau_i$, with T total integration time chosen by the user,
  during the integration time T of said spectrum, one measures and one resets, at each time $\tau'_i$ with i=(1, 2, . . . , n), the corresponding sub-matrix $M_i$ independently of the other sub-matrices of photodetectors $M_j$ with j≠i, the signal measured for each sub-matrix $M_i$ being allocated to storage means,
  one determines the total signal obtained at the time T for each of the sub-matrices $M_i$,
  one measures the spectrum of the beam.

In different embodiments, the present invention also relates to the following features which will be considered individually or according to all their technically possible combinations:

- to obtain the total signal of the sub-matrix $M_i$, one adds for each photodetector of the sub-matrix $M_i$, each of the measurements performed during the time T and one standardises the signal obtained by dividing by $$\frac{T}{\tau'_i},$$

- for each photodetector of the sub-matrix $M_i$, one adds each of the measurements performed during the time T, then one adds for a given line of photodetectors of the sub-matrix $M_i$, the values obtained for each of the photodetectors, the total signal obtained being standardised by dividing by $$\frac{T}{\tau'_i},$$

- one defines before collecting said measurements, with a reference light source having a reference spectrum, the position of the wavelengths on the lines of the matrix of photodetectors,
- one determines the sub-matrix $M_i$ of photodetectors associated with a light flux and one adjusts the dimensions of this sub-matrix by limiting the latter in the direction perpendicular to the diffraction plane to optimise the signal/noise ratio,
- each sub-matrix $M_i$ with i=(1, 2, ..., n) comprises lines of photodetectors receiving a dispersed light flux,
- one measures for each sub-matrix $M_i$ with i=(1, 2, ..., n) lines of photodetectors receiving a signal corresponding to the background noise,
  - one allocates to each of the sub-matrices $M_i$ with i=(1, 2, ..., n) a zero background noise from the first measurement performed thereof,
  - to each new measurement, during the integration time T, one compares the background noise measured with respect to the zero background noise and one determines an offset of the background noise,
  - one corrects the measurements obtained for each of the sub-matrices $M_i$ with i=(1, 2, ..., n).

According to the invention, such method for spectroscopic measurement is particularly suited to the measurement of ray spectra, in particular that implementing ICP, SPARK or GDS techniques, to the Raman spectroscopy or still the NIRS spectroscopy.

In different possible embodiments, the invention will be described more in detail with reference to the appended drawings wherein.

The measuring method makes use of the advantages particular to the CMOS-based imaging devices, i.e., non-destructive reading, a random access which authorises direct selection of the wavelengths. The imaging device 10 with active columns 11 is rotated by an angle of $\pi/2$ radians so that one wavelength is allocated to a line 27 of photodetectors 12. Advantageously, one defines, before collecting the spectrum of a light source to be analysed, the position of ht wavelengths on the lines 27 of the matrix of photodetectors with a reference light source having a reference wavelength spectrum. This reference light source is a reference lamp having a reference spectrum. This reference spectrum is also recorded on a processing unit connected to the imaging device. The acquisition of the reference spectrum by dispersion of the light beam emitted by the reference light source on a dispersive element 28 enables, by comparison with the reference spectrum recorded, to allocate a wavelength to each of the lines 27 of the matrix of photodetectors. The reference source is then replaced with the light source whereof it is sought to analyse the light beam emitted. This light source is for instance a sample interacting with a Raman analysis beam, a near infrared analysis beam or other, or still an inductive coupling source plasma beam or other. The light beam to be analysed comprises a set of light fluxes centred on different wavelengths forming a spectral distribution.

Figure 1:
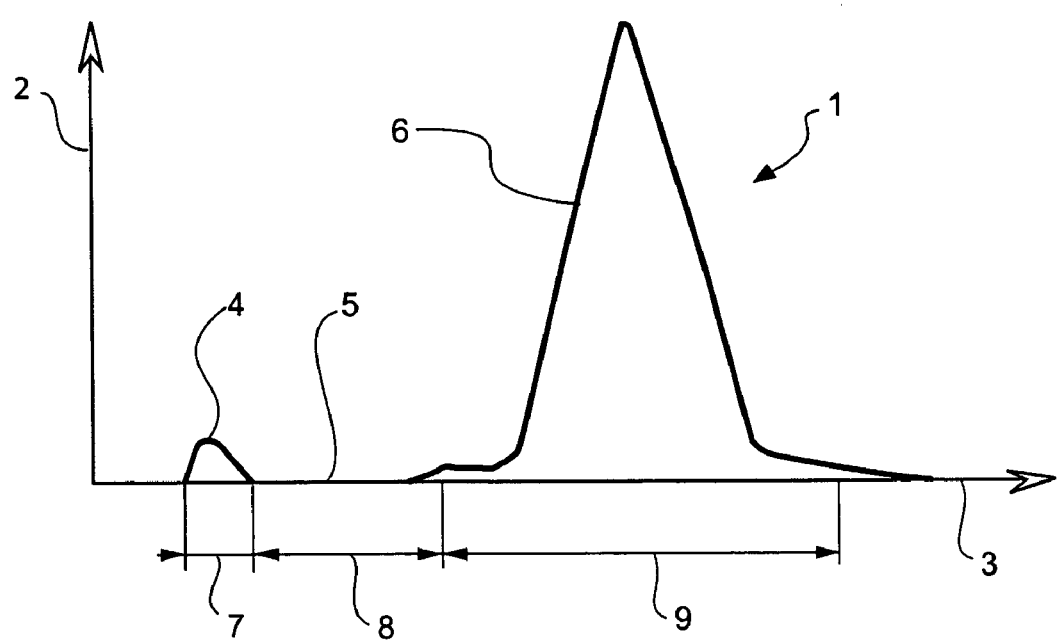
FIG. 1 shows a spectral distribution (intensity in relation to the wavelength) of the previous art exploited with imaging devices of the CCD type.
Figure 2:
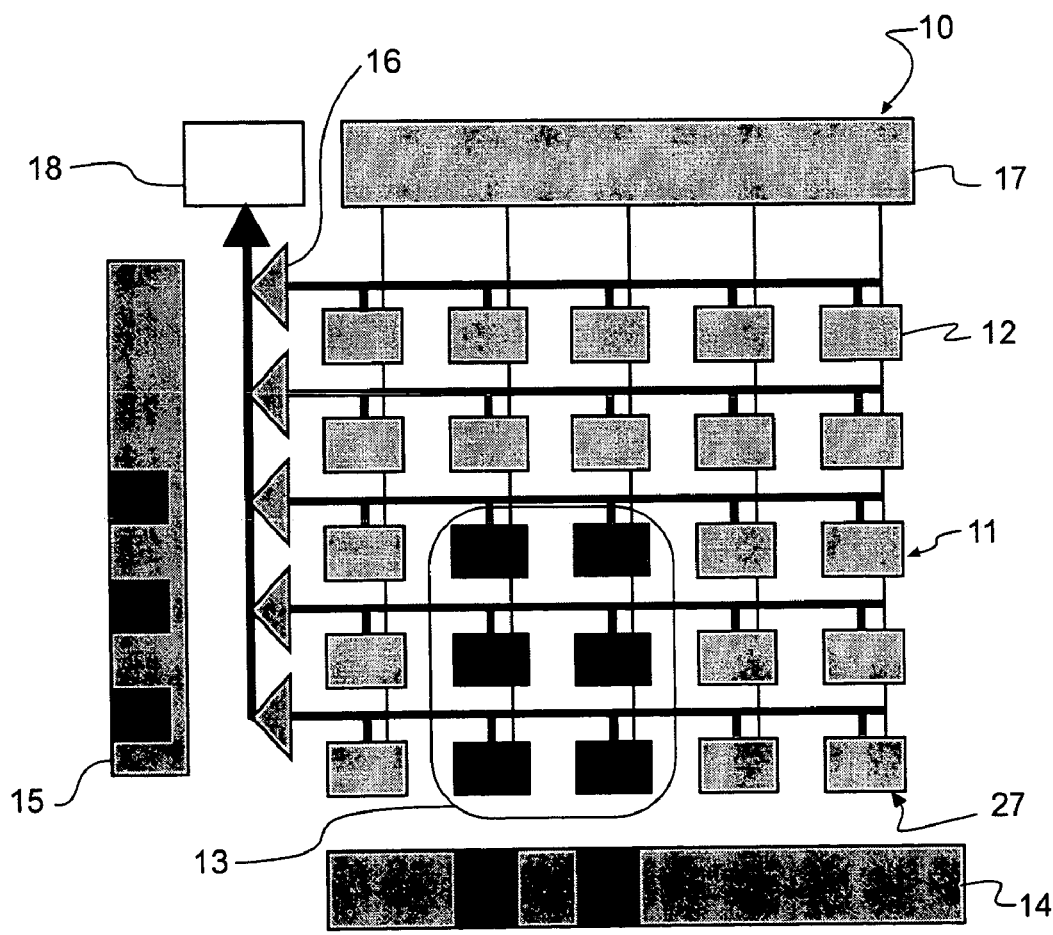
FIG. 2 is a schematic representation of the imaging device with active columns, implemented according to the invention, said device being oriented so that one wavelength is allocated to a line of photodetectors.

One disperses on a dispersive element the set of said light fluxes and the fluxes dispersed are detected on an imaging device 10 (FIG. 2). The imaging device 10 implemented comprises line-column matrix of photodetectors 12 with active columns 11, each of the photodetectors 12 comprising a CMOS-type pixel. The line-column expression should not be understood as limiting the sub-matrix of photodetectors to a particular shape, for instance square, rectangular, ovoid, ..., but is injected to define reference axes within said matrix, said axes being in a preferred embodiment perpendicular or substantially perpendicular to one another. In a particular embodiment, the matrix consists of at least 100 pixels on a column and at least 100 pixels on a line. The dispersive element is, for instance, a diffraction grid, a prism or other.

For the acquisition of the spectrum of a light beam exhibiting a spectral distribution formed by a set of light fluxes each centred over a different wavelength, one determines in a first stage the set of the light fluxes i=(1, 2, ..., n) to be detected, for instance, by a first measurement to an appropriate exposure time. One then determines for each light flux i with i=(1, 2, ..., n), the exposure time $\tau_i$ necessary to measure a maximal intensity $I_{max}$ of said flux. By "maximal intensity $I_{max}$" is meant an intensity equal to 0.8 $I_{sat}$ within ±10% where $I_{sat}$ is the saturation intensity of a photodetector 12. Each of said fluxes (i=1, 2, ..., n) being detected on at least one different line 27 of photodetectors 12, one associates to each of these fluxes a sub-matrix $M_i$ 13 of photodetectors 12. These sub-matrices $M_i$ 13 with i=(1, 2, ..., n) are different from one another. Advantageously, they constitute a small portion of the surface of the main matrix of the imaging device 10, which accelerates the data transfer process.

In a first embodiment, each sub-matrix $M_i$ 13 with i=(1, 2, ..., n) only includes lines 27 of photodetectors 12 receiving a dispersed light flux. In another embodiment, one measures for each sub-matrix $M_i$ 13 with i=(1, 2, ..., n)

lines 27 of photodetectors 12 receiving a signal corresponding to the background noise. It is then possible to correct the variations (offset) of this background noise during the different measurements of the sub-matrices $M_i$ 13. This background noise is mainly due to the reading noise which results from the analogue/digital conversion of the signal and of the noise due to the charges generated thermally. To do so, one allocates to each of the matrices $M_i$ 13 with i=(1, 2, . . . , n) a zero background noise from the first measurement performed thereof. Then, to each new measurement, during the integration time T, one compares the background noise measured with respect to the zero background noise and one determines an offset of the background noise. One corrects the measurements obtained for each of the sub-matrices $M_i$ 13 with i=(1, 2, . . . , n).

The dimensions of the sub-matrix $M_i$ of photodetectors associated with a light flux may moreover be adjusted to optimise the signal/noise ratio. For instance, when measuring the spectrum of a light beam emitted by an inductive coupling plasma source, the light fluxes emitted by the plasma not being spatially homogeneous, its image on the imaging device is not homogeneous either and the spectra received by the different columns are then different. Knowing the location of the elements having the greatest light effect in the plasma for the ray considered, one may then delineate the sub-matrix $M_i$ 13 of photodetectors to the photodetectors receiving the signal of these elements to optimise the signal/noise ratio. One proceeds then to limiting the sub-matrix $M_i$ 13 in the spatial direction, i.e. perpendicular to the spreading direction of the spectrum (or still perpendicular to the diffraction plane).

The times are managed independently on the different sub-matrices 13, by a management which is simple and without any interference of the times between the different sub-matrices 13 of photodetectors 12. The imaging device 10 comprises for instance, a main timer and at most as many sub-timers as sub-matrices 13 of photodetectors 12. The method then enables to read a sub-matrix 13 independently of the other sub-matrices and therefore to accumulate saturation-free charges for less intense light fluxes. In a particular embodiment and according to FIG. 2, the line-column matrix comprises a line addresser 14 and a column addresser 15 in order to select regions in the matrix of photodetectors, amplifying means 16 for each column 11, resetting means 17 of one or several lines 27 (or wavelengths) of photodetectors and an analogue/digital converter 18. The matrix of photodetectors includes, for instance, 1024×1024 pixels of 12×12 $\mu m^2$.

After having determined for each light flux i with i=(1, 2, . . . , n) the exposure time $\tau_i$ necessary to measure a maximal intensity $I_{max}$, one allocates to the sub-matrix $M_i$ of photodetectors an exposure time $\tau'_i$ so that $\tau'_i$ is the largest integer divider of T smaller than $\tau_i$, with T the integration time of said spectrum chosen by the user.

The time $\tau_{imax}$ is the greatest of the times $\tau'_i$. these times $\tau_{imax}$ and $\tau'_i$ define respectively the time of the main timer of the matrix of photodetectors and the time of the sub-timer of the sub-matrix 13 of photodetectors 12 $M_i$. All the lines 27 of photodetectors 12 of a same sub-matrix 13 measuring a given flux are therefore allocated to the same time $\tau'_i$. The time $\tau_{imax}$ corresponds also to the timer of the sub-matrix 13 of photodetectors $M_{imax}$ associated with the lowest intensity light flux dispersed and therefore requiring a longer exposure time to reach the maximal intensity $I_{max}$.

The imaging device 10 once reset, one defines an integration time T of said spectrum, during which at each time $\tau'_i$, one measures and one resets the corresponding sub-matrix $M_i$ 13 independently of the other sub-matrices of photodetectors $M_j$ with j≠i. By "integration time" is meant the exposure time $\tau_{imax}$ multiplied by the number of acquisitions or of measurements calculated. The signal measured for each sub-matrix $M_i$ with i=(1, 2, . . . , n) is allocated in storage means, for instance a buffer memory. One then determines the total signal obtained at the time T for each of the sub-matrices $M_i$ and one measures the spectrum of the beam. One may visualise this spectrum on visualisation means and/or record said spectrum on storage means. These visualisation means include for instance a screen.

Two representations of the spectrum are then possible:

an imaging mode or 2D-mode wherein one reconstructs the two-dimensional image pixel by pixel of the spectrum. To obtain the total signal of each sub-matrix $M_i$ 13, one then adds for each photodetector 12 of the sub-matrix $M_i$ 13, each of the measurements performed during the integration time T and one standardises the signal obtained by dividing by $$\frac{T}{\tau'_i}.$$

a spectral mode: each pixel of a same line 27 representing a same wavelength, one performs the vertical sum (pixel bining) of the signals for each line 27 of each sub-matrix $M_i$ 13 in order to obtain a spectrum characterising the distribution of the light intensity relative to the wavelength. The light intensities are standardised in relation to the number of acquisitions before or after said vertical summing.

The imaging device 10 being rotated by $\pi/2$ radians, no standardisation of the signal with respect to the different gains of the amplifiers 16 is necessary, since each wavelength being allocated to a given column 11, it uses the same amplifiers 16.

The invention also relates to a device for spectroscopic measurement of the spectrum of a light beam comprising a set of light fluxes each centred over a different wavelength wherein the set of said fluxes is dispersed on a dispersive element and the fluxes dispersed are detected on an imaging device 10 comprising a matrix of photodetectors with active columns 11, each of the photodetectors 12 comprising a CMOS-type pixel. The imaging device 10 with active columns is directed so that one wavelength is allocated to a line 27 of photodetectors to enable simultaneous analysis of light fluxes each centred over a different wavelength and having a sensitivity greater than the intrinsic dynamic of said photodetectors. Preferably, such device comprises means to set for each sub-matrix $M_i$ 13 with i=(1, 2, . . . , n) of photodetectors. 12, an exposure time $\tau'_i$ so that $\tau'_i$ is the largest integer divider of T smaller than $\tau_i$, with T total integration time chosen by the user, means for storing the signal measured for each sub-matrix $M_i$ 13 of photodetectors, a processing unit to determine the total signal obtained at the time T for each of the sub-matrices $M_i$ 13 and means for visualising the spectrum of the beam. It may also comprise a reference light source having a reference spectrum.

We shall now describe different examples of new and useful spectroscopic measurements, according to the invention and which can be realised thanks to said method.

EXAMPLE

Figure 3:
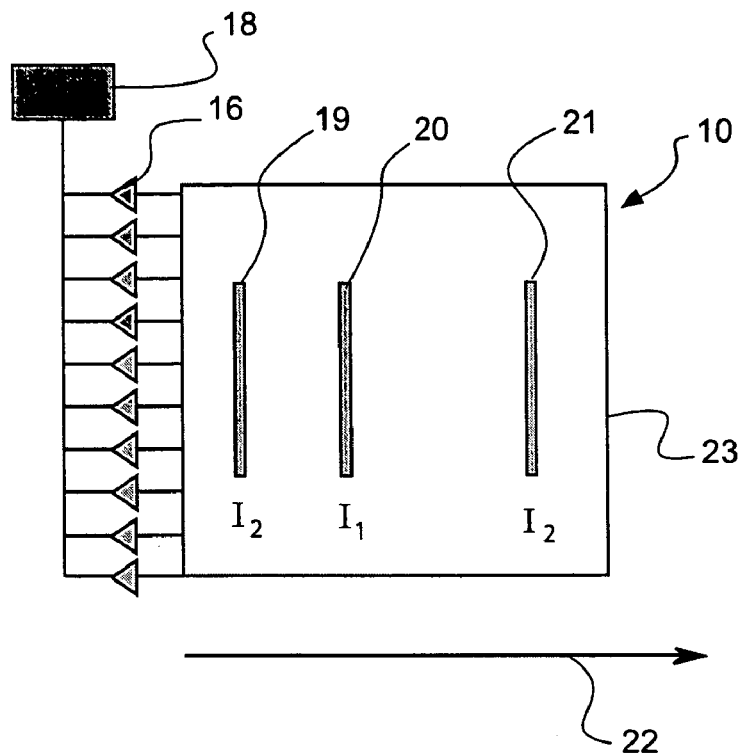
FIG. 3 is a schematic representation of a spectrum on the matrix of photodetectors of the imaging device, according to a particular implementation embodiment of the invention.
Figure 4:
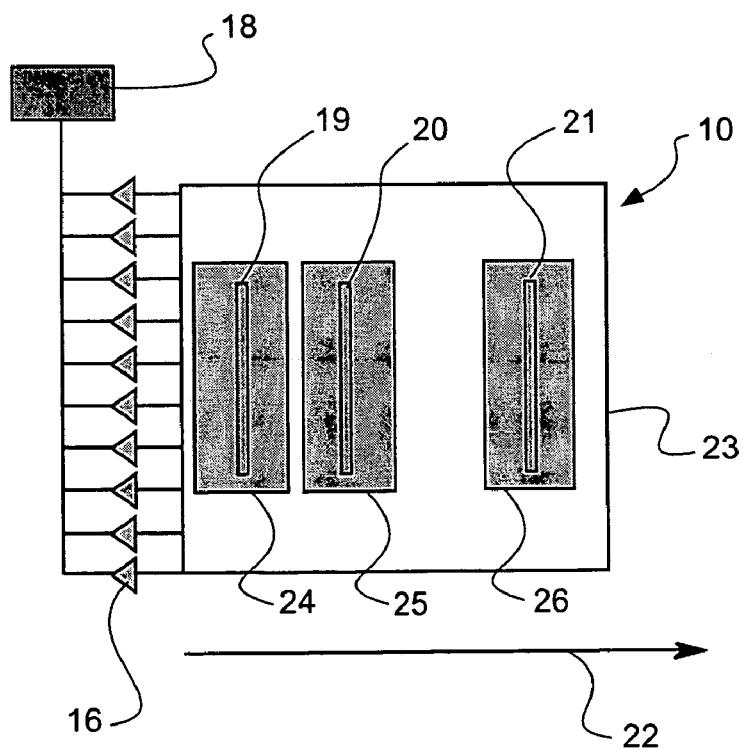
FIG. 4 is a schematic representation of the sub-matrices associated with the light fluxes of the spectrum of FIG. 3.
Figure 5:
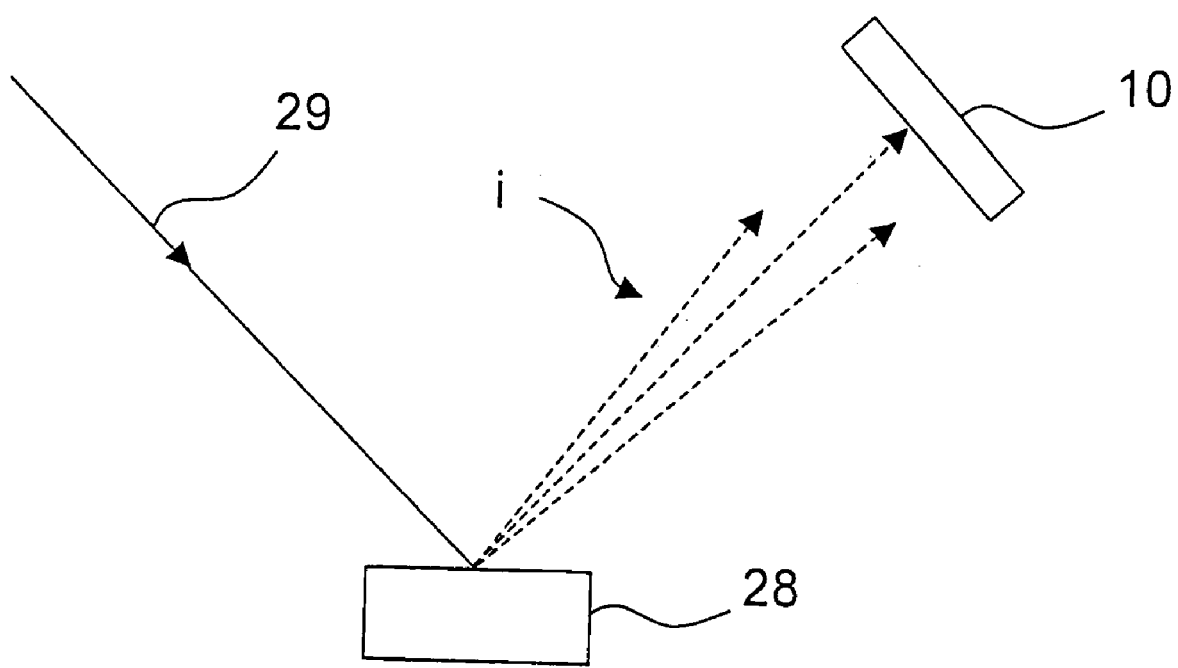
FIG. 5 is a schematic representation of the dispersive element and the imaging device.

FIG. 3 gives a first implementation embodiment of the invention for the measurement of the spectrum of a light beam emitted by an inductive coupling plasma source. This light beam includes three rays 19 to 21, i.e. three light fluxes each centred over a different wavelength (axis 22). The distribution of these rays 19 to 21 on the matrix of photodetectors 23 of the imaging device 10 is as follows: a first ray 19, quite luminous on the left (luminosity $I_2$), a second ray 20, little luminous (luminosity $I_1$) at the centre, then a third ray 21, of luminosity substantially equal to the first on the right (luminosity $I_2$). One then selects three sub-matrices $M_i$ with i=(1,2,3) 24 to 26 with the line 14 and column 15 addressers on the main matrix 23 of photodetectors, each of the three sub-matrices $M_i$ 24 to 26 being associated with a ray 19 to 21. Then, for each of both sub-matrices 24 and 26, one allocates an exposure time corresponding to the luminosity of the ray 19 and 21, which means that the saturation intensity of the pixels should not be reached. The second ray 20, little sensitive and in the centre, has an exposure time $T_1$ significantly greater than both other light rays 19 and 21 (exposure time $T_2$). These different sub-matrices 24-26 are represented on FIG. 4. Time $T_1$ correspond to the main timer $\tau_{imax}$ and the time $T_2$ is allocated to the sub-timer. One then determines a total integration time T of the rays which is a multiple integer of the times $T_1$ and $T_2$.

The integration sequence is as follows:
a) Integrate during a time $T_2$ the rays 19 to 21 of luminosities $I_1$ and $I_2$. For each measurement, the electronic offset determined previously should be subtracted.
b) The first and third rays 19, 21 very luminous 12 being close to the maximal intensity $I_{max}$, the charge accumulated by each pixel corresponding to both sub-matrices $M_i$ with i=(1, 3) 24, 26 is read. The charge accumulated by these pixels is then reset. These reading and resetting operations are non-destructive for the sub-matrix $M_2$ 25 having the time $T_1$.
c) One repeats the steps a) and b) until the time $T_1$ has been reached. The second ray 20, little luminous, is then close to the maximal intensity $I_{max}$, one reads the charge accumulated by each pixel corresponding to the sub-matrix $M_2$ 25. The charge accumulated by these pixels is then reset. These reading and resetting operations are non-destructive for the sub-matrices 24, 26 allocated with the time $T_2$.
d) One repeats the steps a) to c) until the total integration time T has been reached. Each time a sub-matrix $M_i$ 24-26 with i=(1,2,3) is read, the signal is added to the signal of the previous readings. The total signal is obtained by dividing this signal by the number of sub-exposures necessary ($T/T_2$ and $T/T_1$) for each of the sub-matrices 24-26. One thus calculates a time-averaged spectrum.

Advantageously, the different wavelengths use each the same column amplifiers and are therefore subjected to the same average gain. One has therefore the same average gain and the same offset, which enables to break free from any standardisation with respect to the gains and to the offsets of the column amplifiers.

The invention claimed is:

1. A device for spectroscopic measurement of the spectrum of a light beam comprising a set of light fluxes each centred over a different wavelength, said device comprising a dispersive element to disperse the set of said light fluxes and an imaging device to detect the light fluxes dispersed, the imaging device comprising line-column matrix of photodetectors with active columns, each of the photodetectors comprising a CMOS-type pixel and the imaging device with active columns being directed so that one wavelength is allocated to a line of photodetectors to enable simultaneous analysis of light fluxes, each centred over a different wavelength and having different light intensities, the device comprising:
a means to set an exposure time $\tau'_i$ for each sub-matrix $M_i$ of the matrix of photodetectors, said sub-matrix $M_i$ being associated with a dispersed light flux, $\tau'_i$ being the largest integer divider of T smaller than $\tau_i$, with T total integration time chosen by the user, and $\tau_i$ the exposure time necessary to measure a maximal intensity $I_{max}$ of said considered flux, wherein flux i is greater than or equal to 1.

2. A measuring device according to claim 1, further comprising:
means for storing the signal measured for each sub-matrix $M_i$ of photodetectors;
a processing unit to determine the total signal obtained at the time T for each of the sub-matrices $M_i$; and
means for visualising the spectrum of the beam, wherein flux i is equal to a whole number greater than or equal to 1.

3. A measuring device according to claim 2, further comprising a reference light source having a reference spectrum.

4. A method for spectroscopic measurement of the spectrum of a light beam comprising a set of light fluxes each centred over a different wavelength, whereon the set of said fluxes is dispersed over a dispersive element and the fluxes dispersed are detected on an imaging device comprising a matrix of photodetectors with active columns, each of the photodetectors comprising a CMOS-type pixels, the method comprising:
directing the imaging device with active columns so that one wavelength is allocated to a line of photodetectors;
determining for each light flux the exposure time $\tau_i$ necessary to measure a maximal intensity $I_{max}$ and the sub-matrix $M_i$ of photodetectors associated with said light flux, each of said fluxes being detected on at least one different line of photodetectors;
allocating to the sub-matrix $M_i$ of photodetectors an exposure time $\tau'_i$ so that $\tau'_i$ is the largest integer divider of T smaller than $\tau_i$, with T total integration time chosen by the user;
measuring and resetting during the integration time T of said spectrum, at each time $\tau'_i$, the corresponding sub-matrix $M_i$ independently of the other sub-matrices of photodetectors $M_j$ with j≠i, the signal measured for each sub-matrix $M_i$ being allocated to storage means;
determining the total signal obtained at the time T for each of the sub-matrices $M_i$; and
measuring the spectrum of the beam, wherein flux i is equal to a whole number greater than or equal to 1.

5. A method for spectroseopic measurement according to claim 4, further comprising obtaining the total signal of the sub-matrix $M_i$ by adding for each photodetector of the sub-matrix $M_i$ each of the measurements performed during the time T and standardizing the signal obtained by dividing by $T/\tau'_i$.

6. A method for spectroscopic measurement according to claim 4, further comprising adding each of the measurements performed during the time T for each photodetector of the sub-matrix $M_i$, adding for a given line of photodetectors of the sub-matrix $M_i$, the values obtained for each of the photodetectors, the total signal obtained being standardised by dividing by $T/\tau'_i$.

7. A method for spectroscopic measurement according to claim 4, further comprising defining before collecting said measurements with a reference light source having a reference spectrum the position of the wavelengths on the lines of the matrix of photodetectors.

8. A method for spectroscopic measurement according to claim 4, further comprising determining the sub-matrix $M_i$ of photodetectors associated with a light flux and one adjusts the dimensions of this sub-matrix by limiting the latter in the direction perpendicular to the diffraction plane to optimise the signal/noise ratio.

9. A method for spectroscopic measurement according to claim 4, wherein each sub-matrix $M_i$ comprises lines of photodetectors receiving a dispersed light flux, and wherein i is equal to a whole number greater than or equal to 1.

10. A method for spectroscopic measurement according to claim 4, further comprising measuring for each sub-matrix $M_i$ lines of photodetectors receiving a signal corresponding to the background noise, wherein i is equal to a whole number greater than or equal to 1.

11. A method for spectroscopic measurement according to claim 10, further comprising:

allocating to each of the sub-matrices $M_i$ a zero background noise from the first measurement performed thereof;

to each new measurement, during the integration time T, comparing the background noise measured with respect to the zero background noise and determining an offset of the background noise; and correcting the measurements obtained for each of the sub-matrices $M_i$, wherein i is equal to a whole number greater than or equal to 1.

12. An application of the method for spectroscopic measurement according claim 4 to atomic emission, preferably chosen among an ICP, SPARK or GDS technique.

13. An application of the method for spectroscopic measurement according to claim 4 to Raman.

* * * * *